(12) United States Patent
Buchwitz et al.

(10) Patent No.: US 10,589,589 B2
(45) Date of Patent: Mar. 17, 2020

(54) INTEGRATED STEERING YOKE AND SPRING SEAT FOR SUSPENSION SYSTEMS

(71) Applicant: Ford Global Technologies, LLC, Dearborn, MI (US)

(72) Inventors: Joe L. Buchwitz, Huntington Woods, MI (US); John Wesley Stanley, Belleville, MI (US); Vijay Bokil, Troy, MI (US); James Adam Drozdowski, Canton, MI (US); Timothy Panagis, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 118 days.

(21) Appl. No.: 15/691,457

(22) Filed: Aug. 30, 2017

(65) Prior Publication Data

US 2019/0061455 A1    Feb. 28, 2019

(51) Int. Cl.
| | | |
|---|---|---|
| *B60G 11/107* | (2006.01) | |
| *B60G 11/113* | (2006.01) | |
| *B60G 9/00* | (2006.01) | |
| *B60G 11/04* | (2006.01) | |

(52) U.S. Cl.
CPC .............. *B60G 11/107* (2013.01); *B60G 9/00* (2013.01); *B60G 11/04* (2013.01); *B60G 11/113* (2013.01); *B60G 2200/464* (2013.01); *B60G 2204/121* (2013.01); *B60G 2204/43* (2013.01)

(58) Field of Classification Search
CPC . B62D 17/00; B62D 7/16; B62D 7/20; B60K 17/30; B60G 11/107; B60G 11/113; B60G 11/04; B60G 2200/44; B60G 2200/422; B60G 2204/121; B60G 2204/4306; B60G 9/00
USPC .............. 180/252–254; 280/93.502, 93.512, 280/124.156, 124.175, 124.176, 86.751, 280/86.753
See application file for complete search history.

(56) References Cited

U.S. PATENT DOCUMENTS

| | | | | |
|---|---|---|---|---|
| 2,261,821 | A | * 11/1941 | Dobson | B60G 17/0162 180/435 |
| 2,290,554 | A | 7/1942 | Hack | |
| 2,356,164 | A | * 8/1944 | Keese | B60K 17/306 180/254 |
| 2,531,268 | A | * 11/1950 | Herrington | B60K 5/04 180/254 |
| 3,749,196 | A | * 7/1973 | Traylor | B60G 5/047 180/24.11 |
| 3,913,937 | A | * 10/1975 | Longworth | B60G 5/047 267/52 |
| 4,203,195 | A | 5/1980 | Nakae et al. | |
| 4,733,744 | A | * 3/1988 | Glaze | B60B 35/14 180/256 |

(Continued)

FOREIGN PATENT DOCUMENTS

| | | |
|---|---|---|
| CN | 203805775 | 9/2014 |
| DE | 60010567 | 9/2004 |

(Continued)

*Primary Examiner* — Ruth Ilan
(74) *Attorney, Agent, or Firm* — Ray Coppiellie; Hanley, Flight & Zimmerman, LLC

(57) ABSTRACT

Vehicle suspension systems are described herein. An example vehicle suspension includes a yoke to couple a knuckle to an axle of the vehicle suspension. The yoke includes a post to receive the axle and a lobe projecting from the post.

14 Claims, 13 Drawing Sheets

(56) References Cited

U.S. PATENT DOCUMENTS

| | | | | |
|---|---|---|---|---|
| 5,303,985 A | * | 4/1994 | Barnholt | B60B 35/006 301/124.1 |
| 5,664,847 A | * | 9/1997 | Bear | B60B 35/003 180/258 |
| 5,820,147 A | * | 10/1998 | Rohweder | B60G 9/00 280/93.51 |
| 6,086,075 A | * | 7/2000 | O'Bryan | B62D 7/22 280/89.12 |
| 6,179,308 B1 | | 1/2001 | Mielauskas et al. | |
| 6,367,830 B1 | | 4/2002 | Annequin et al. | |
| 6,910,681 B1 | * | 6/2005 | Hitt | B60G 7/008 267/52 |
| 6,994,405 B2 | * | 2/2006 | Li | B60B 35/003 180/258 |
| 8,177,246 B2 | | 5/2012 | Cortez et al. | |
| 9,133,534 B2 | | 9/2015 | Mitchick et al. | |
| 2007/0045915 A1 | * | 3/2007 | Svendsen | B60G 9/003 267/37.3 |
| 2014/0138929 A1 | * | 5/2014 | Wilson | B60G 11/113 280/124.11 |
| 2015/0014953 A1 | * | 1/2015 | Pierce | B60G 11/113 280/124.1 |
| 2016/0059654 A1 | * | 3/2016 | Takayama | B60G 11/113 267/195 |

FOREIGN PATENT DOCUMENTS

| | | |
|---|---|---|
| EP | 1043212 | 10/2000 |
| GB | 2347908 | 9/2000 |
| JP | 2800611 | 7/1998 |
| KR | 100580457 | 5/2006 |

\* cited by examiner

INTEGRATED STEERING YOKE AND SPRING SEAT FOR SUSPENSION SYSTEMS

FIELD OF THE DISCLOSURE

This disclosure relates generally to suspensions and, more particularly, to integrated steering yoke and spring seat for suspension systems.

BACKGROUND

A vehicle suspension system provides an articulated connection between a wheel and a chassis of a vehicle so that the wheel may traverse a jounce and rebound path when the vehicle is driven over an irregular surface. A suspension also includes a spring device for resiliently supporting the chassis upon the wheels of a vehicle.

SUMMARY

An example vehicle suspension includes a yoke to couple a knuckle to an axle of the vehicle suspension. The yoke includes a post to receive the axle and a lobe projecting from the post.

Another example vehicle suspension includes a yoke to couple a steerable wheel assembly to a solid axle. The yoke has a post to receive the solid axle and a clamp-engaging surface positioned adjacent the post. A clamp is to couple a leaf spring assembly of the vehicle suspension to the yoke. The clamp has a lobe-engaging surface to matably engage the clamp-engaging of the yoke when the clamp is coupled to the yoke. The clamp is rotatable relative to the clamp-engaging surface of the yoke to adjust at least one of a first pinion angle of the vehicle suspension or a first caster angle of the wheel assembly.

Another example vehicle suspension includes means for coupling a wheel end assembly to an axle of the vehicle suspension. The means for coupling including: means for attaching the means for coupling to the axle; means for seating; and means for enabling adjustment of at least one of a pinion angle of the vehicle suspension or a caster angle of the wheel end assembly. The vehicle suspension includes means for clamping to couple means for biasing to the means for seating. The means for clamping is rotatable relative to the means of enabling adjustment of the means for coupling to adjust the at least one of the pinion angle or the caster angle.

Figure 1:
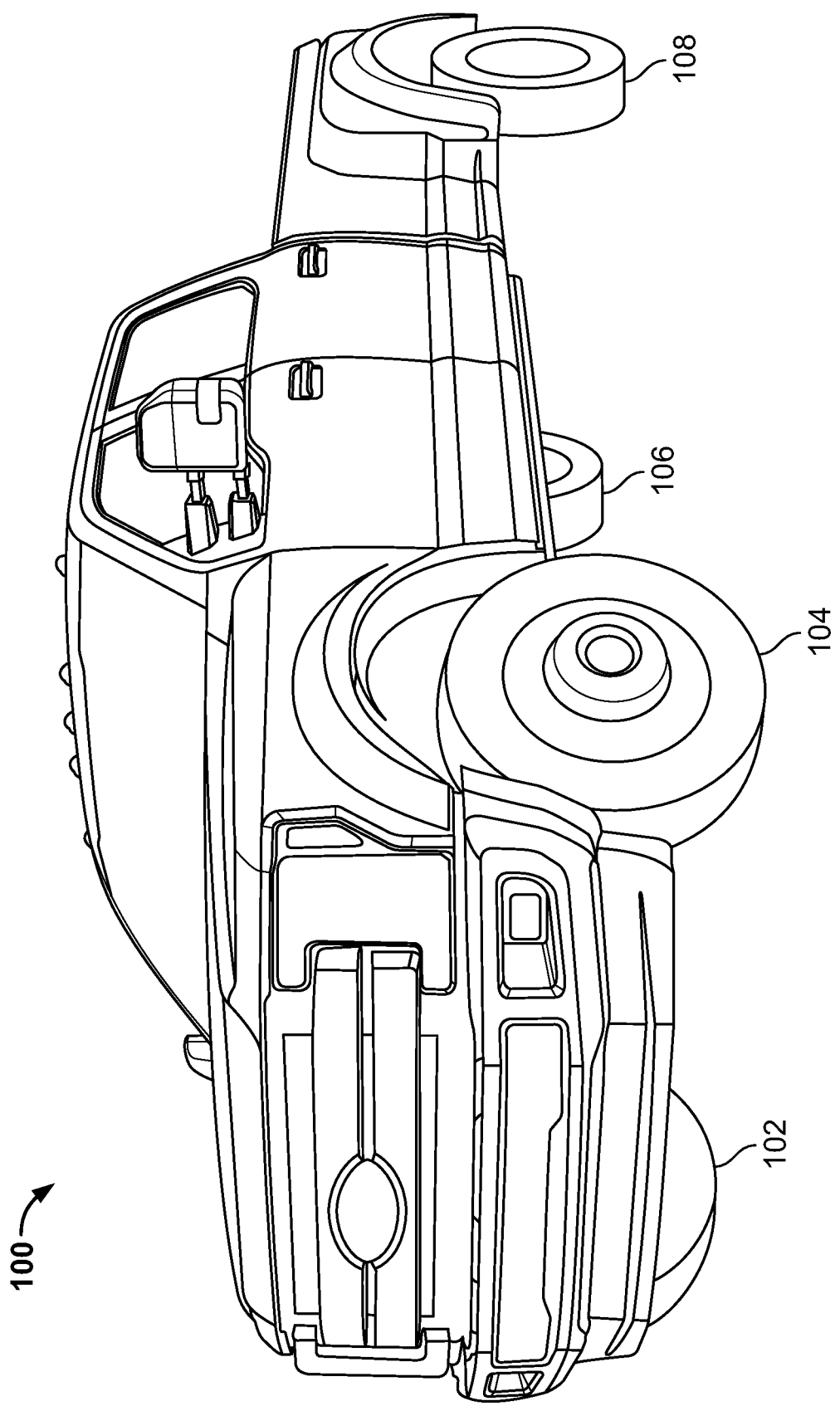
FIG. 1 represents an example vehicle that may be implemented with an example vehicle suspension in accordance with the teachings of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Stating that a part is coupled or connected to another part indicates that the parts are joined directly or through one or more intervening parts. Thus, physical contact is not required for two parts to be coupled or connected.

DETAILED DESCRIPTION

Some known vehicles employ solid axle and leaf spring suspension systems. Such solid axle and leaf spring suspension systems provide ruggedness, lower manufacturing costs, and are often employed with heavy duty or heavy payload vehicles (e.g., commercial trucks, military vehicles, etc.). Such solid axles exhibit great capacity for weight. To increase (e.g., maximize) roll stiffness characteristic(s) of a leaf spring suspension, the leaf spring may be positioned or mounted at an outboard-most lateral location of an axle. For example, a right-side leaf spring and a left-side leaf spring are spaced at a greatest possible distance (e.g., a width, a lateral position) between a left wheel and a right wheel of a vehicle. However, to reduce an overall mass of a vehicle, a wheel track width of the vehicle should be maintained as small as possible. Thus, to provide increased roll stiffness characteristic(s) while reducing an overall mass of a vehicle, the left-side leaf spring of a leaf spring suspension can be attached in proximity (e.g., immediately adjacent) to a left wheel (e.g., a left wheel hub) and the right-side leaf spring of a leaf spring suspension can be attached in proximity (e.g., immediately adjacent) to a right wheel (e.g., a right wheel hub).

Solid axle leaf spring suspension systems typically include non-steerable wheels. For non-steerable suspensions, a desired vehicle wheel track width and leaf spring mounting locations may be accomplished without significant interference from other vehicle components. As a result, a mounting location of the leaf spring suspension system can be positioned at a desired, outboard-most lateral position relative to a frame of the vehicle to optimize both roll stiffness performance and vehicle weight.

Some vehicles utilize all-wheel steering functionality such that rear wheels provide steering in addition to front wheels, which improves vehicle handling, vehicle maneuverability, and/or may enable a vehicle control module to provide advanced steering features. Implementing a fourwheel steer system (e.g., front and/or rear wheel steerability) may require increasing a vehicle wheel track width to accommodate additional steering components such as, for example, knuckles, yokes, and/or ball joints. For example, implementing a steerable wheel system on a solid rear axle (e.g., a Hotchkiss solid rear axle) may cause steerable hardware (e.g., a knuckle, ball joint yoke, etc.) of a wheel assembly to interfere with a desired leaf spring mounting location (e.g., in proximity to the wheel hubs). In other words, steerable hardware such as, for example, a knuckle and/or a ball joint yoke may interfere with positioning a left leaf spring of the leaf spring suspension system in proximity to the left wheel hub and the right leaf spring of the leaf spring suspension system in proximity to the right wheel hub to achieve a desired vehicle roll stiffness performance or a vehicle wheel track width. For example, in some instances, a leaf spring seat lateral mounting location and steering yoke hardware of a steerable wheel assembly may occupy the same space when coupled to the vehicle suspension. For example, when implementing a rear-steer system on a Hotchkiss solid rear axle, the steerable hardware can conflict with a desired or legacy leaf spring mounting location.

As a result, the left leaf spring and the right leaf spring may need to be repositioned inboard or closer to a middle of the solid axle. Moving the left spring leaf and the right spring leaf location inboard provides a narrower spring-base, which reduces roll stiffness characteristic(s) or performance of the vehicle. For example, a narrower spring-base may cause a small side force to sway or tilt the body relative to the axle through a considerable roll angle making it uncomfortable for the vehicle passengers and/or provides unwanted steering influence, thereby decreasing vehicle performance. Increasing a lateral distance to accommodate the steering hardware may increase a vehicle wheel track width, which may increase overall mass of the vehicle.

Example vehicle suspension apparatus disclosed herein accommodate steering components of a wheel assembly without narrowing a spring-base of a vehicle suspension and without increasing a vehicle wheel track width. To accommodate the steering components, example vehicle suspension apparatus disclosed herein employ a yoke. An example yoke may include a unitary body (e.g., one-piece structure) that couples (e.g., welds) to an axle (e.g., an axle tube) and receives a knuckle that couples a steerable wheel assembly to the axle. In some examples, example yoke apparatus disclosed herein may be employed with solid axles and support steerable wheel assemblies. In some examples, the yoke apparatus disclosed herein may be employed with any suspension (e.g., solid rear axle suspensions having leaf springs, coil springs, air springs with multi-links and/or any other suspensions). The yoke apparatus disclosed herein can be used with any type of vehicle(s) (e.g., heavy-duty vehicles, trucks, automobiles, passenger vehicles, military vehicles, etc.).

Additionally, while example yoke apparatus disclosed herein supports steerable wheel assemblies and/or hardware, the example yoke apparatus disclosed herein do not affect a mounting location of a leaf spring suspension system (e.g., a Hotchkiss solid axle suspension). In other words, a left leaf spring may be positioned in proximity (e.g., immediately adjacent) to a left wheel assembly (e.g., a left wheel hub) and a right leaf spring may be positioned in proximity (e.g., immediately adjacent) a right wheel assembly (e.g., a right wheel hub), thereby maximizing a lateral distance between the right leaf spring and the left leaf spring for improved roll characteristics. In other words, example yoke apparatus disclosed herein enable leaf suspension mounting locations to be similar (e.g., identical or the same) between a vehicle employing a solid axle supporting a non-steerable wheel assembly or hardware and a vehicle (e.g., the same vehicle) employing a solid axle supporting a steerable wheel assembly or hardware. Therefore, the example yoke apparatus disclosed herein enable positioning of a leaf spring suspension at an outermost outboard location relative to the solid axle and/or the vehicle frame without interfering with a steering hardware (e.g., a knuckle and/or a ball joint yoke) of a wheel assembly. Further, example yoke apparatus disclosed herein do not require increased vehicle wheel track width to accommodate the steering components or hardware. Example yokes disclosed herein provide an integrated leaf spring seat and steering yoke structure. Example yokes disclosed herein include a solid axle leaf spring seat structure to provide the most compact package possible, which is required to implement a rear-steer system on a Hotchkiss solid axle arrangement, while maintaining legacy leaf spring architecture, package and/or frame design.

It will be appreciated by those skilled in the art that vehicles often have a front or rear axle with a fixed caster angle, or a rear drive axle with a fixed a pinion angle. In some instances, the example yoke apparatus enables positioning the wheel base at different pinion angles relative to angle of a driveshaft coupled to a differential of an axle. The example yoke apparatus disclosed herein enable different pinion angles and/or caster angles to accommodate different vehicles. For example, example yoke apparatus disclosed herein enable pinion angles relative to a drive shaft of between approximately less than one-degree and ten degrees. To adjust the pinion angle and/or the caster angle, the example vehicle suspension systems disclosed herein employ a spacer, a wedge and/or a shim to effectively rotate the pinion of the differential upward or downward relative to a centerline of a driveshaft. For example, a first spacer having a planner profile may be provided to set an ideal pinion angle (e.g., a pinion angle that results in minimum or substantially zero driveshaft vibration) relative to the center line of the driveshaft and a second spacer having a tapered profile may be provided to set a pinion angle between approximately 1 and 7 degrees relative to the centerline of the driveshaft.

FIG. 1 is an example vehicle 100 that may implement the teachings of this disclosure. The vehicle 100 of the illustrated example includes front wheels 102, 104 supported by a front suspension and rear wheels 106, 108 supported by a rear suspension. The front suspension associated with the front wheels 102, 104 provides steerability to the front wheels 102, 104. Likewise, the rear suspension associated with the rear wheels 106, 108 provides steerability to the rear wheels 106, 108. The vehicle 100 may be a body-on-frame construction or unibody construction. In some examples, the vehicle 100 may be a Ford F-Super Duty Commercial Truck. The example teachings of this disclosure may be implemented with any type of suspension (e.g., a steerable suspension, a non-steerable suspension) and/or any other types of vehicles.

Figure 2:
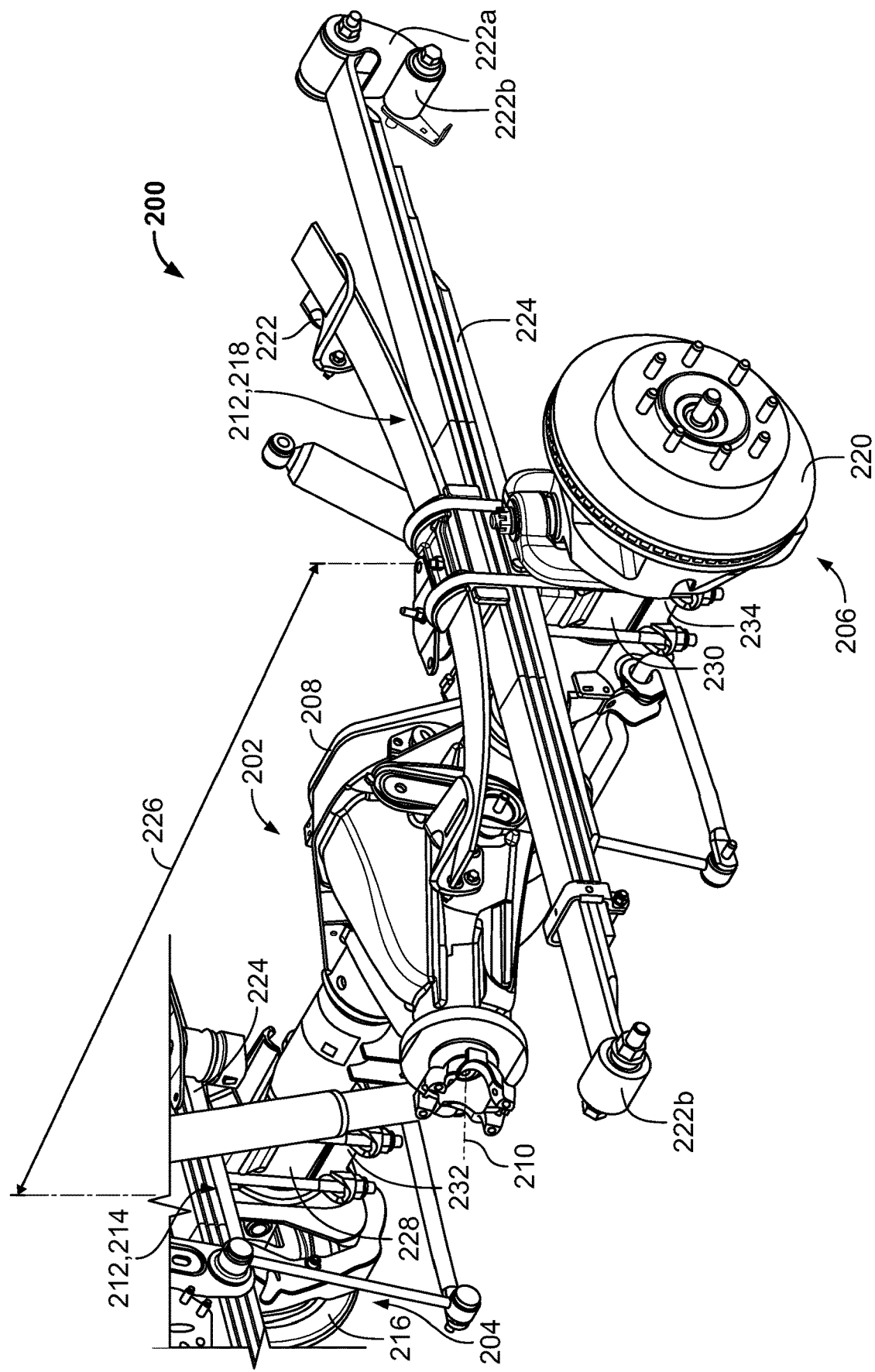
FIG. 2 is a perspective view of an example vehicle suspension of the example vehicle of FIG. 1.

FIG. 2 is an example vehicle suspension 200 of the vehicle 100 of FIG. 1. Specifically, the vehicle suspension 200 of the illustrated example may implement the rear suspension associated with the rear wheels 106, 108 (FIG. 1) of the vehicle 100. The vehicle suspension 200 of the illustrated example is a steerable solid axle, leaf spring suspension. Such example steerable solid axle suspensions (e.g. live leaf spring suspensions) may be referred to as Hotchkiss suspensions. Although the example vehicle suspension is described in connection with the rear suspension or a rear solid axle, leaf spring suspension, the teachings of the disclosure may also be applied to the front suspension of the vehicle 100 associated with the front wheels 102, 104 (FIG. 1) and/or any other type of suspension(s).

Referring to FIG. 2, the vehicle suspension 200 of the illustrated example includes an axle 202 (e.g., a steerable, rear axle) to couple the rear wheels 106, 108 (FIG. 1) of the vehicle 100 to a chassis or frame of the vehicle 100. The axle 202 of the illustrated example includes a wheel assembly 204 (e.g., a first or right-side wheel assembly) to support the rear wheel 106 (FIG. 1) and a wheel assembly 206 (e.g., a second or left-side wheel assembly) to support the rear wheel 108 (FIG. 1). The axle 202 of the illustrated example includes a differential 208 (e.g., differential gearing) that is coupled to a powertrain 210 (e.g., via a driveshaft) and distributes driving torque to the rear wheels 106, 108 (FIG. 1) of the vehicle 100 via the wheel assembly 204 and the wheel assembly 206. To provide lateral stability to the vehicle 100 and provide an anti-roll stabilizer, the vehicle suspension 200 of the illustrated example includes a biasing element or leaf spring system 212. The leaf spring system 212 of the illustrated example includes a leaf spring assembly 214 (e.g., a first or right-side leaf spring assembly) positioned in proximity (e.g., adjacent) to the wheel assembly 204 (e.g., a right-side wheel hub 216) of the vehicle 100 and a leaf spring assembly 218 (e.g., a second or left-side leaf spring assembly) positioned in proximity (e.g. adjacent) to the wheel assembly 206 (e.g., a left-side wheel hub 220). The leaf spring assembly 214 and the leaf spring assembly 218 include leaf spring brackets 222 (e.g., shackles 222a, eyes 222b, etc.) to couple or secure (e.g., ends of) of biasing elements or leaf springs 224 to a chassis or frame of the vehicle 100. A lateral distance 226 (e.g., perpendicular to a longitudinal axis of the vehicle 100) between the leaf spring assembly 214 and the leaf spring assembly 218 affect roll characteristics or performance of the vehicle 100.

As described in greater detail below, a yoke 228 couples the wheel assembly 204 and the leaf spring assembly 214 to the axle 202 and a yoke 230 couples the wheel assembly 206 and the leaf spring assembly 218 to the axle 202. The yoke 228 of the illustrated example is positioned in proximity to the leaf spring assembly 214 and the yoke 230 of the illustrated example is positioned in proximity to the leaf spring assembly 218. In particular, the yoke 228 and the yoke 230 enable mounting locations of the respective leaf spring assemblies 214 and 218 to be the same as mounting locations of the leaf spring assembly 214 and the leaf spring assembly 218 of non-steerable axle variants, thereby reducing manufacturing costs and/or complexity. For example, the lateral distance 226 of the illustrated example is substantially similar (e.g., within 10%) of a lateral distance of a non-steerable axle that may be implemented with the vehicle 100 of the illustrated example.

To couple the leaf spring system 212 to the axle 202 via the yokes 228, 230 the vehicle suspension 200 of the illustrated example includes a fastener or clamp 232 (e.g., a first clamp) and a fastener or clamp 234 (e.g., a second clamp). In the illustrated example, the clamp 232 attaches or secures the leaf spring assembly 214 to the yoke 228 and the clamp 234 attaches or secures the leaf spring assembly 218 to the yoke 230.

The yoke 228, the wheel assembly 204, the leaf spring assembly 214, and the clamp 232 are identical to the yoke 230, the wheel assembly 206, the leaf spring assembly 218 and the clamp 234. Therefore, the description of the yoke 230, the wheel assembly 206, the leaf spring assembly 218 and the clamp 234 will not be further discussed.

Further, although the example yokes 228 and 230 are described in connection with a solid axle leaf spring suspension, the yokes 228 and 230 of the illustrated example may be employed with any suspension (e.g., solid axle suspensions having coil springs, air springs with multi-links and/or any other biasing element defining a suspension of a vehicle that support steerable wheel assemblies and/or non-steerable wheel assemblies). Also, although the example yokes 228 and 230 are described in connection with the vehicle 100 (e.g., a truck) illustrated in FIG. 1, the yokes 228 and 230 of the illustrated example may couple to any type of axle and/or may be used with any other type of vehicles including, but not limited to, passenger vehicles, military vehicles, etc.

Figure 3:
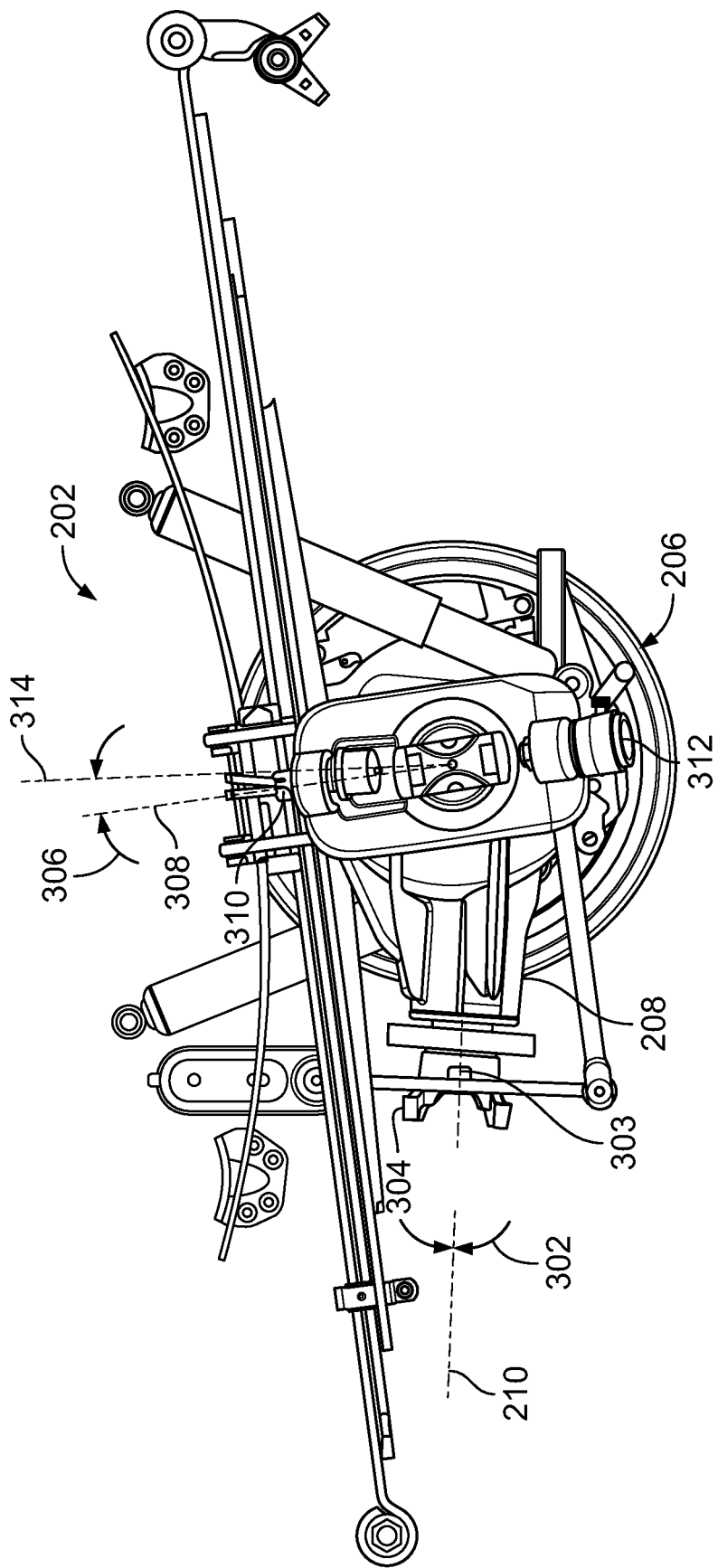
FIG. 3 is a side view of the example vehicle suspension of FIG. 2.

FIG. 3 is a side view of the example vehicle suspension 200 of FIG. 2. It will be appreciated by those skilled in the art that vehicles often have a front or rear axle with a fixed caster angle, or a rear drive axle with a fixed pinion angle. The vehicle suspension 200 of the illustrated example includes a pinion angle 302 relative to a centerline of the powertrain 210 (e.g., a driveshaft) that is nominal or ideal (e.g., slightly greater than zero degrees, less than one-degree, etc.). In other words, a centerline 303 of a pinion gear (e.g., positioned in a housing or pinion yoke 304) of the differential 208 is in-line with a centerline of a driveshaft of the powertrain 210. Additionally, the wheel assembly 204 (FIG. 2) and/or the wheel assembly 206 of the illustrated example has a caster angle 306 (e.g., an angle between a centerline 308 passing through a ball joint 310 (e.g., an upper ball joint) and a ball joint 312 (e.g., a lower ball joint 312) and a vertical reference 314). As described in greater detail below, the pinion angle 302 and/or the caster angle 306 can be adjusted (e.g., increased or decreased). Thus, the vehicle suspension 200 of the illustrated example may accommodate a variety of pinion angles and/or caster angles. For example, the vehicle suspension 200 of the illustrated example can accommodate pinion angles relative to the powertrain 210 between approximately less than one-degree and ten degrees. As a result of the yoke 228 and the clamp 232, the vehicle suspension 200 or the axle 202 of the illustrated example can be used in a variety of installations where different pinion angles and/or caster angles may be needed.

Figure 4:
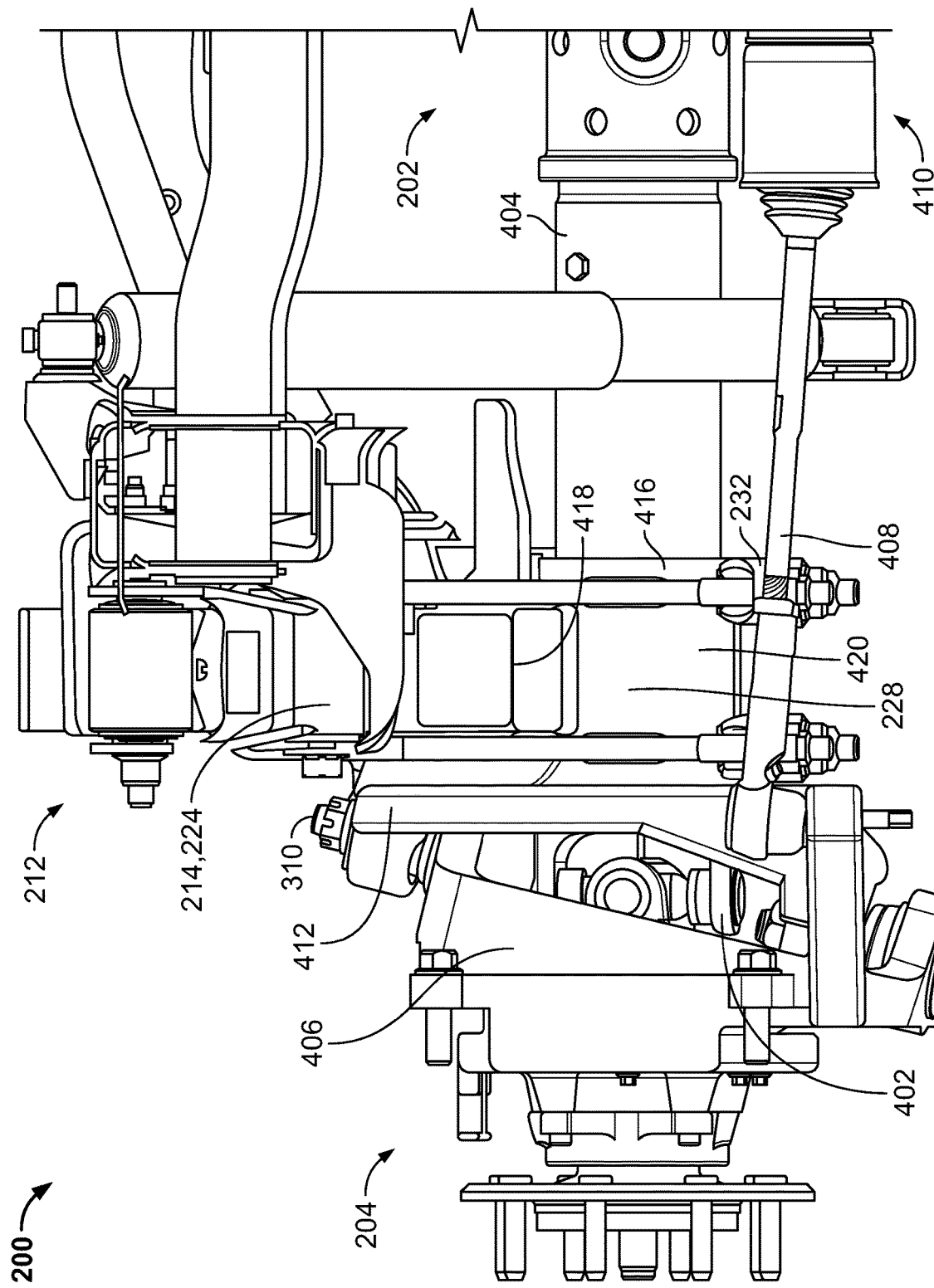
FIG. 4 is a partial, rear view of the example vehicle suspension of FIGS. 2-3.

FIG. 4 is an enlarged, partial side view of the vehicle suspension 200 of FIGS. 2 and 3. FIG. 4 shows components of a right-side of the vehicle suspension 200 of FIG. 2, but it will be appreciated that similar components, configured for the left-side of the vehicle suspension 200, would be provided to form a full suspension as shown, for example, in FIG. 2. The axle 202 of the illustrated example includes an axle shaft 402 rotatably coupled within a solid axle housing or axle tube 404. The axle shaft 402 rotates within the axle tube 404 to provide rotational movement to the wheel assembly 204. To allow for steerability of the wheel assembly 204 and, thus, the rear wheel 106 (FIG. 1) of the vehicle 100, the vehicle suspension 200 of the illustrated example includes a knuckle 406. The knuckle 406 of the illustrated example transfers steering rotation to the mounted wheel assembly 204. For example, a tie rod 408 of a steering assembly 410 moves or pivots the knuckle 406 relative to the yoke 228, which turns the wheel assembly 204 and, thus, the rear wheel 106 during steering.

To couple the wheel assembly 204 (e.g., via the knuckle 406) to the axle 202, the vehicle suspension 200 of the illustrated example includes the yoke 228. The yoke 228 of the illustrated example includes a knuckle-receiving portion 412 to receive the knuckle 406. Thus, the knuckle 406 of the illustrated example attaches to the knuckle-receiving portion 412 of the yoke 228. Specifically, the yoke 228 of the illustrated example receives the ball joint 310 (e.g., a ball stud or fastener) and the ball joint 312 (e.g., a ball stud or fastener) of the knuckle 406 to pivotally couple the knuckle 406 to the yoke 228.

To couple the yoke 228 to the axle 202, the yoke 228 of the illustrated example is coupled to the axle tube 404. For example, the yoke 228 of the illustrated example includes an axle tube receiving portion or post 416. For example, the post 416 of the illustrated example receives at least a portion of the axle tube 404. In some examples, the yoke 228 of the illustrated example provides means for coupling the wheel assembly 204 (e.g., the knuckle 406) to the axle 202 (e.g., the axle tube 404) of the vehicle suspension 200. In some examples, the post 416 of the illustrated example provides means for attaching the yoke 228 (e.g., the means for coupling) to the axle 202. The yoke 228 of the illustrated example is welded to the axle tube 404. However, in other examples, the yoke 228 may be coupled to the axle tube 404 via any other fastener (e.g., a clamp, a screw, etc.).

Additionally, the yoke 228 of the illustrated example couples the leaf spring assembly 214 to the axle 202. To support the leaf spring assembly 214, the yoke 228 of the illustrated example includes a supporting surface or spring seat 418. The spring seat 418 of the illustrated example receives or supports the leaf springs 224 of the leaf spring assembly 214. In some examples, the spring seat 418 of the yoke 228 of the illustrated example provides means for seating or supporting a biasing element (e.g., the leaf springs 224).

In the illustrated example, the clamp 232 attaches or secures the leaf spring assembly 214 to the yoke 228. As described in greater detail below, the clamp 232 of the illustrated example engages a lobe 420 of the yoke 228 when the clamp 232 is coupled to the yoke 228. As described in greater detail below, the clamp 232 of the illustrated example is rotatable along at least a portion of the lobe 420 to adjust at least one of the pinion angle 302 (FIG. 3) of the vehicle suspension 200 or the caster angle 306 (FIG. 3) of the wheel assembly 204. In some examples, the lobe 420 of the illustrated example provides means for enabling adjustment of at least one of the pinion angle 302 or the caster angle 306. In some examples, the clamp 232 of the illustrated example provides means for clamping to couple the leaf spring assembly 214 (e.g., means for biasing) to the means for seating (e.g., the spring seat 418), where the means for clamping is rotatable relative to the lobe 420 (e.g., means for enabling adjustment) to adjust at least one of the pinion angle 302 or the caster angle 306.

Figure 5A:
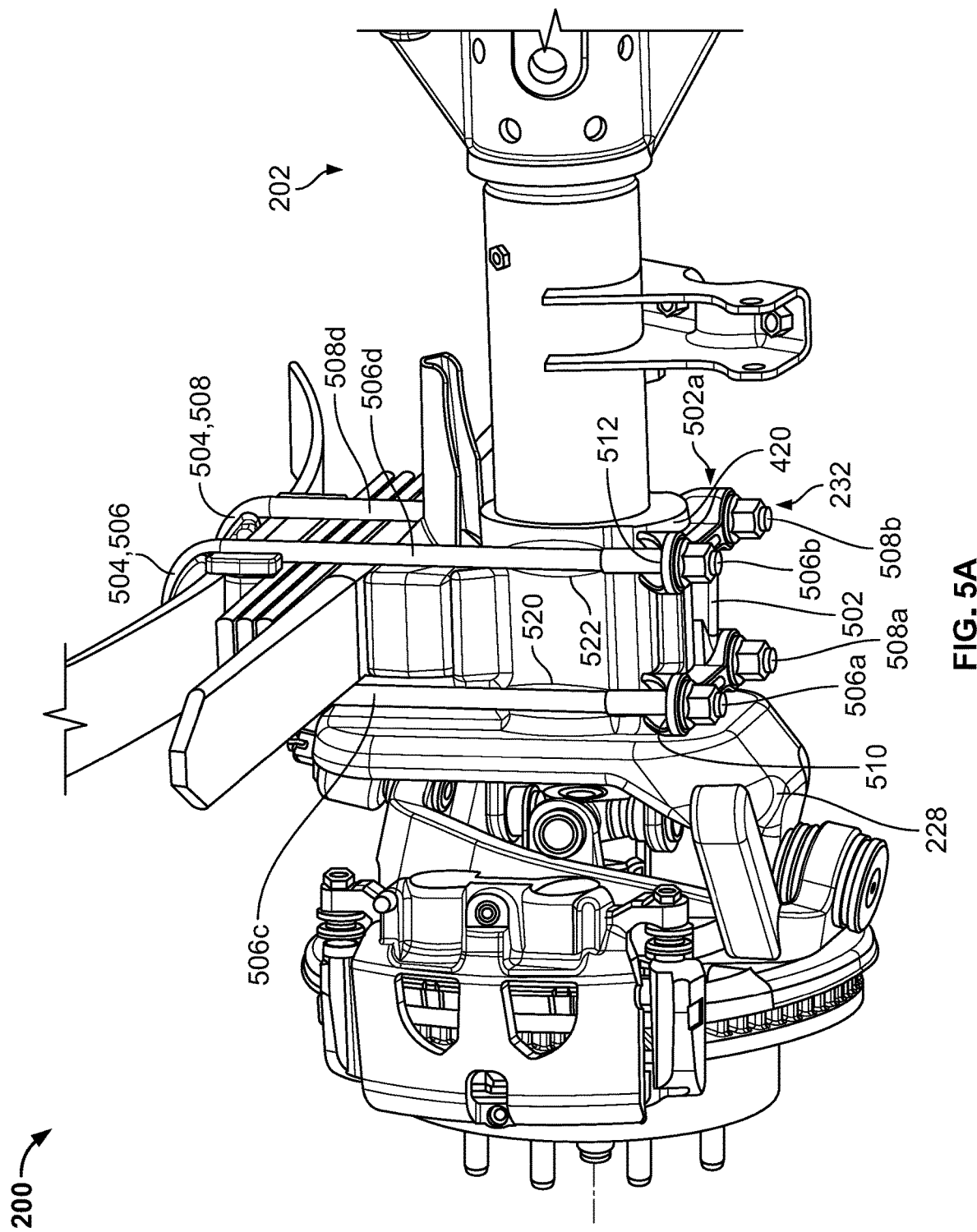
FIG. 5A is a partial perspective, rear view of the example vehicle suspension of FIGS. 2-4.
Figure 5B:
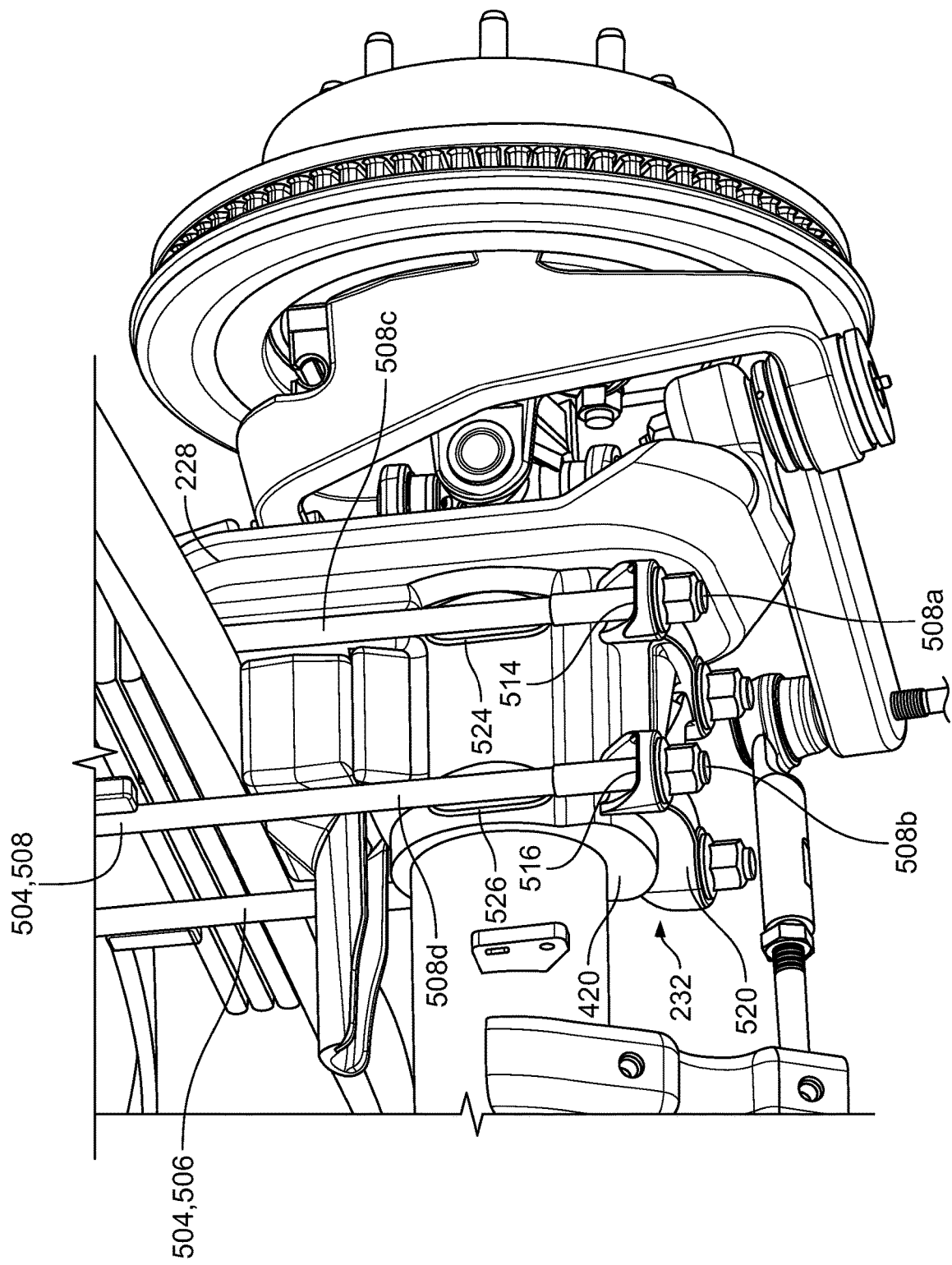
FIG. 5B is a partial perspective, front view of the example vehicle suspension of FIGS. 2-4 and 5A.

FIG. 5A is a front perspective view of the vehicle suspension 200 of FIGS. 2-4. FIG. 5B is a rear perspective view of the vehicle suspension 200 of FIGS. 2-4. The clamp 232 of the illustrated example includes a guide plate 502 (e.g., a bracket) and a fastener 504 removably coupled to the guide plate 502. To receive the fastener 504, the guide plate 502 of the illustrated example includes a fastener-receiving portion 502a. The fastener of the illustrated example includes a first fastener 506 and a second fastener 508. The first fastener 506 and the second fastener 508 of the illustrated example are U-shaped bolts. The first fastener 506 has a U-shaped profile that includes first and second ends 506a and 506b that are received by respective first and second apertures 510 and 512 (FIG. 5A) of the fastener-receiving portion 502a of the guide plate 502. The second fastener 508 has a U-shaped profile that includes first and second ends 508a and 508b that are received by respective third and fourth apertures 514 and 516 (FIG. 5B) of the fastener-receiving portion 502a of the guide plate 502. The guide plate 502 of the illustrated example includes a rectangular profile or shape. Thus, a respective one of the apertures 510-516 of the fastener-receiving portion 502a is positioned or formed in a respective corner of the guide plate 502. As shown in FIG. 5A, the yoke 228 of the illustrated example includes a first notch or recess 520 to receive or guide a first body or shank 506c of the first fastener 506 and a second notch or recess 522 to receive or guide a second body or shank 506d of the first fastener 506. Likewise, referring to FIG. 5B, the yoke 228 of the illustrated example includes a third notch or recess 524 to receive or guide a first body or shank 508c of the second fastener 508 and a second notch or recess 526 to receive or guide the second body or shank 508d of the second fastener 508. The notches 520-526 permit rotational positioning of the guide plate 502 relative to the lobe 420 of the yoke 228 to provide the pinion angle 302 and/or the caster angle 306.

Figure 6A:
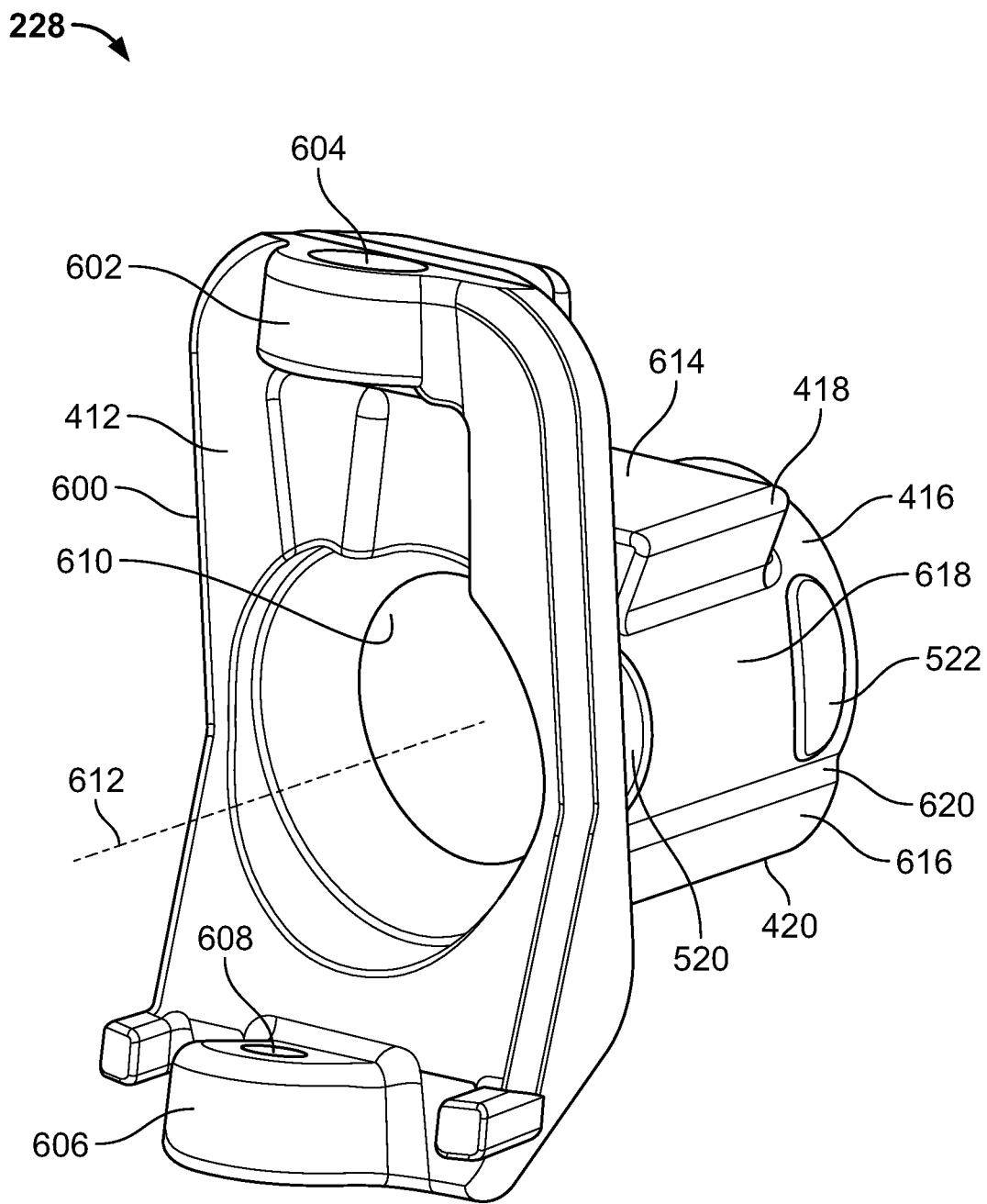
FIGS. 6A-6C are perspective views of an example yoke of the example vehicle suspension of FIGS. 2-4, 5A and 5B.
Figure 6C:
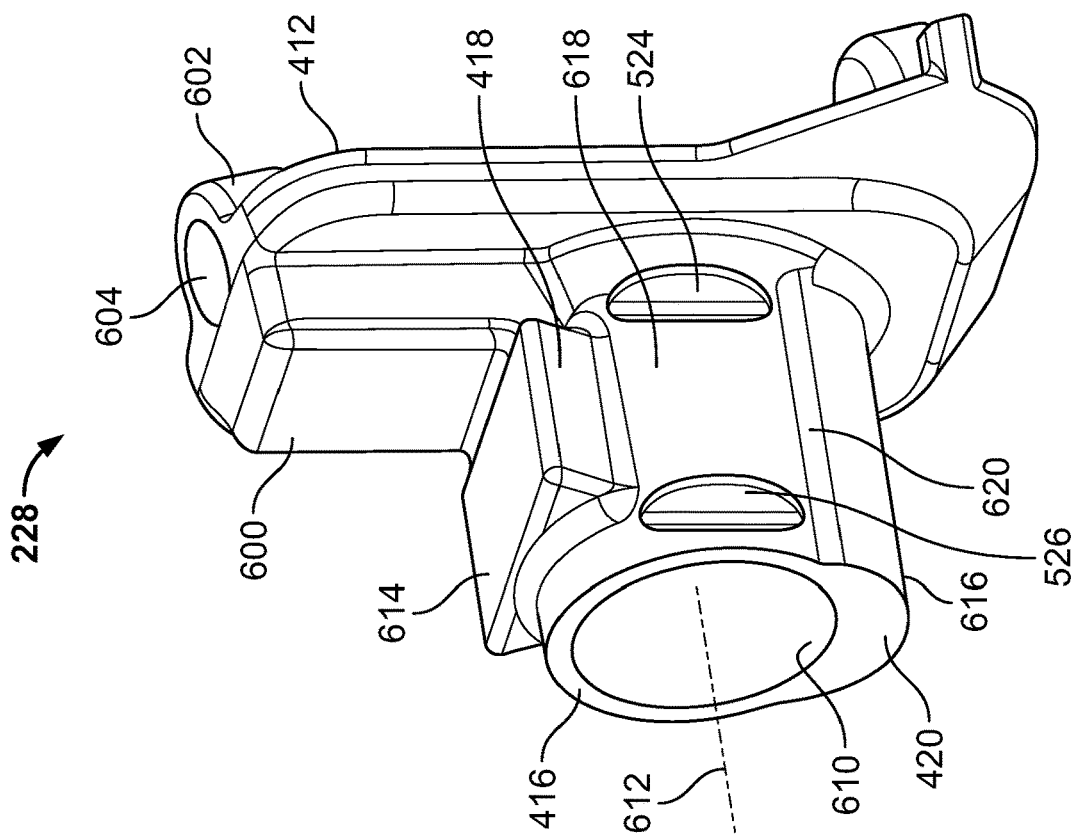
Figure 6B:
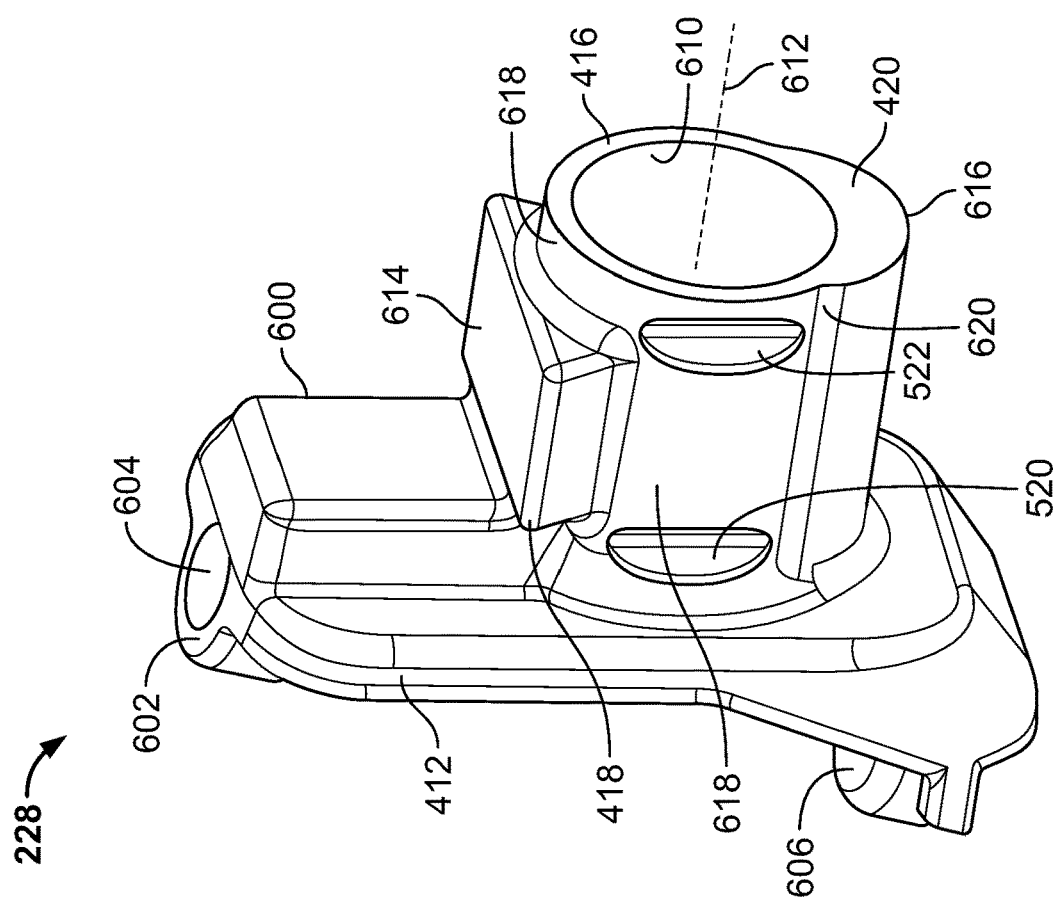

FIGS. 6A-6C are perspective views of the yoke 228 of FIGS. 2-4, 5A and 5B. The yoke 228 of the illustrated example includes a unitary body 600 (e.g., a one-piece structure). The unitary body 600 of the yoke 228 of the illustrated example defines the knuckle-receiving portion 412, the post 416, the spring seat 418 and the lobe 420. The knuckle-receiving portion 412 includes a first boss 602 defining a first aperture 604 to receive (e.g., an upper ball stud of) the ball joint 310 of the knuckle 406 (FIGS. 3 and 4) and a second boss 606 defining a second aperture 608 to receive (e.g., a lower ball stud of) the ball joint 312 of the knuckle 406 (e.g., FIGS. 3 and 4). The first aperture 604 and/or the second aperture 608 may receive a bushing or slug (i.e., a ball joint and/or an alignment slug) having an opening to receive a ball joint (e.g., a ball stud) to provide the caster angle 306 and/or a camber angle of the wheel 106. For example, the first aperture 604 and/or the second aperture 608 may receive a first slug and/or a second slug different than the first slug to provide different caster angles or camber angles for different vehicles without having to modify the structure of the yoke 228.

To provide a first caster angle and/or a first camber angle, a first slug may be positioned in the first aperture 604 and/or the second aperture 608. For example, the first slug includes an opening having a longitudinal axis that is coaxially aligned with a central axis of the first aperture 604 when the first slug is positioned in the first opening 604 or coaxially aligned with a central axis of the second aperture 608 when the first slug is positioned in the second opening 608.

To provide a second caster angle and/or a second camber angle different than the first caster angle and/or the first camber angle, a second slug may be provided in the first aperture 604 and/or the second aperture 608. For example, the second slug includes an opening having a longitudinal axis that is offset relative to a central axis of the first aperture 604 and/or a central axis of the second aperture 608. In some examples, a first slug may be positioned in the first aperture 604 and a second slug may be positioned in the second aperture 608, or vise-versa. Further, the slugs may facilitate assembly of the knuckle 406 and the yoke 228 when using the ball joint 310 and/or the ball joint 312.

The post 416 of the illustrated example protrudes from the knuckle-receiving portion 412 (e.g., in a direction away from the knuckle-receiving portion 412). The post 416 of the illustrated example includes a cylindrical profile having an aperture or opening 610 to receive the axle tube 404 (FIG. 4). Thus, the opening 610 of the post 416 has a diameter that is substantially equal to (e.g., within a 10% tolerance of) a diameter of an outer surface of the axle tube 404.

The spring seat 418 of the illustrated example projects from the post 416 in a direction away from a central axis 612 of the opening 610 (e.g., in a direction toward the first boss 602). To receive or support the leaf spring assembly 214, the spring seat 418 of the illustrated example includes a seating surface 614 having a rectangular profile and/or a substantially flat profile (e.g., a surface having a slope of between zero degrees and one-degree relative to horizontal, a surface having a slope of less than one-degree relative to horizontal, etc.).

The lobe 420 of the illustrated example projects or extends from the post 416 (e.g., in a direction away from the central axis 612 or towards the second boss 606). Thus, the post 416 of the illustrated example is positioned between the spring seat 418 and the lobe 420. The lobe 420 of the illustrated example extends along a portion (e.g., a perimeter or circumference) of the post 416 and defines a clamp-engaging surface 616 about which the guide plate 502 engages and/or rotates to change the pinion angle 302 or the caster angle 306. The clamp-engaging surface 616 of the illustrated example has an arcuate or curved surface. More specifically, the arcuate surface of the illustrated example has a radius of curvature that is substantially similar (e.g., identical to or within 10% tolerance) of a radius of curvature of the outer surface of the axle tube 404 (FIG. 4). Thus, although the post 416 has an outer surface 618 that has a diameter or radius of curvature that is different than (e.g., larger than) the diameter or the radius of curvature of the outer surface of the axle tube 404, the arcuate surface of the lobe 420 of the illustrated example has a radius of curvature that is similar (e.g., identical) to the radius of curvature of the outer surface of the axle tube 404. Such matching between the radius of curvature of the clamp-engaging surface 616 of the lobe 420 and radius of curvature of the outer surface of the axle tube 404 enables use of the guide plate 502 for a non-steerable vehicle suspension, thereby increasing commonality of components between steerable vehicle suspensions (e.g., the vehicle suspension 200) and non-steerable suspensions and reducing manufacturing parts and/or complexity. However, in some examples, the radius of curvature of the lobe 420 may be different (e.g., greater or less) than the radius of curvature of the axle tube 404.

To achieve such radius of curvature of the clamp-engaging surface 616 of the lobe 420, the yoke 228 of the illustrated example has a stepped surface or stepped transition 620 between (e.g., the outer surface 618 of) the post 416 and the lobe 420 (e.g., the clamp-engaging surface 616 of the lobe 420). Additionally, the lobe 420 of the illustrated example provides additional structure to improve a stiffness characteristic of the yoke 228. For example, the lobe 420 increases a dimensional thickness of the post 416 such that the yoke 228 can withstand larger clamping forces generated by the clamp 232 without damaging (e.g., crushing) for example, the outer surface 618 of the post 416.

The notches 520-526 are formed in the outer surface 618 of the post 416 and are positioned between the spring seat 418 and the lobe 420. The notches 520-526 of the illustrated example are elongated such that a length of the of notches 520-526 in the longitudinal direction (e.g., a vertical direction in the orientation of FIGS. 6A-6C) is greater than a width of the notches 520-526 in the lateral direction (e.g., a horizontal direction in the orientation of FIGS. 6A-6C) The yoke 228 of the illustrated example may be formed via casting, injection molding, additive manufacturing (e.g., three dimensional printing) and/or any other manufacturing process(es).

Figure 7:
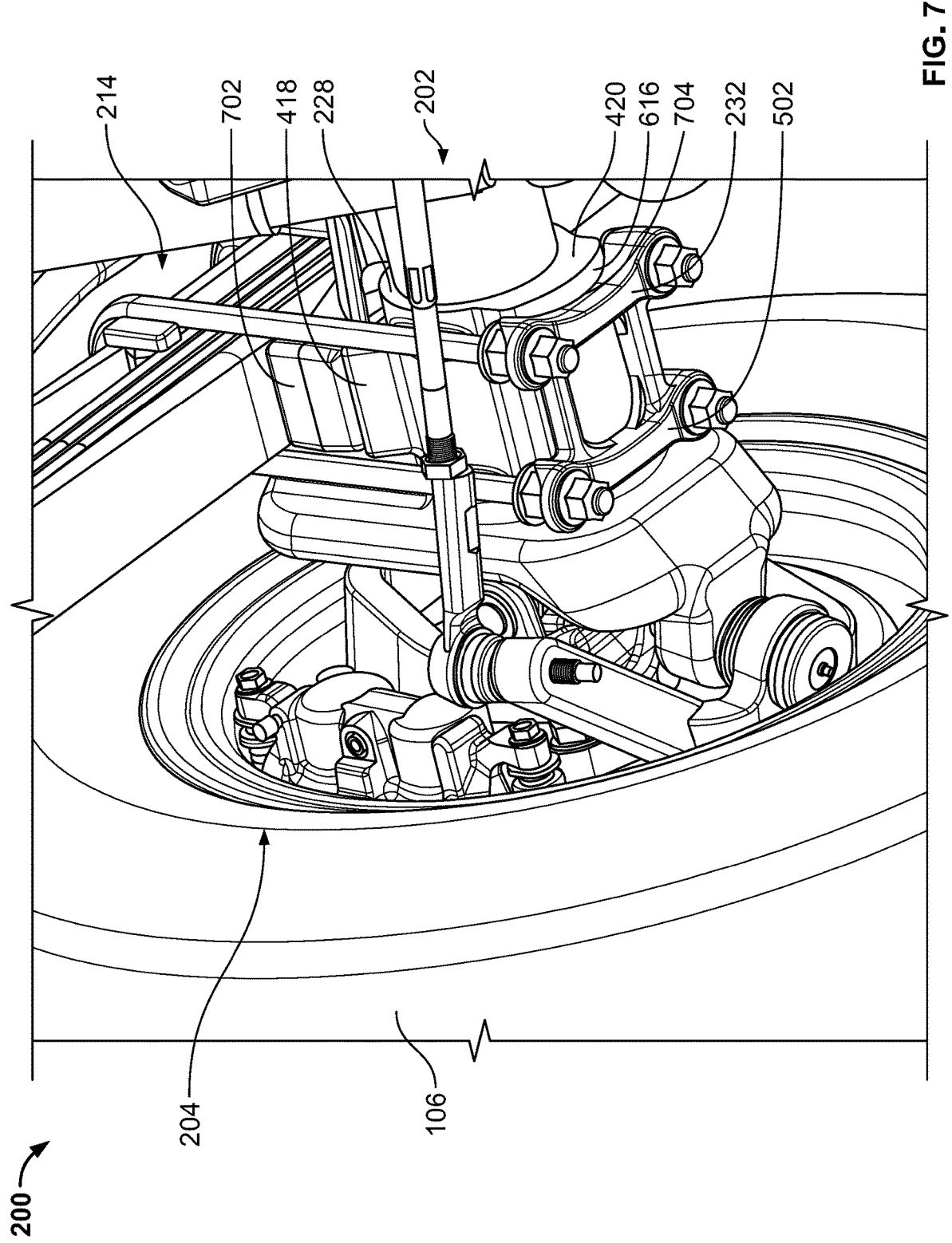
FIG. 7 is a partial, perspective view of the example vehicle suspension of FIGS. 2-4, 5A and 5B.

FIG. 7 is a perspective view of a portion of the vehicle suspension 200 of FIGS. 2-4, 5A and 5B. To provide the pinion angle 302 and/or the caster angle 306, the leaf spring assembly 214 of the illustrated example employs a spacer 702. The spacer 702 of the illustrated example is positioned between leaf spring assembly 214 and the spring seat 418 of the yoke 228. As shown in FIG. 7, the clamp 232 (e.g., the guide plate 502) is positioned relative to the lobe 420 of the yoke 228 to accommodate or provide the pinion angle 302 and/or the caster angle 306. As noted above, the guide plate 502 of the illustrated example can rotate relative to the clamp-engaging surface 616 of the lobe 420. Specifically, the clamp-engaging surface 616 of the lobe 420 is complementary to a lobe-engaging surface 704 of the guide plate 502 such that the lobe-engaging surface 704 of the guide plate 502 matably engages the clamp-engaging surface 616 of the yoke 228. For example, a radius of curvature of the clamp-engaging surface 616 of the lobe 420 is substantially similar (e.g., identical) to a radius of curvature of the lobe-engaging surface 704 of the guide plate 502.

Figure 8A:
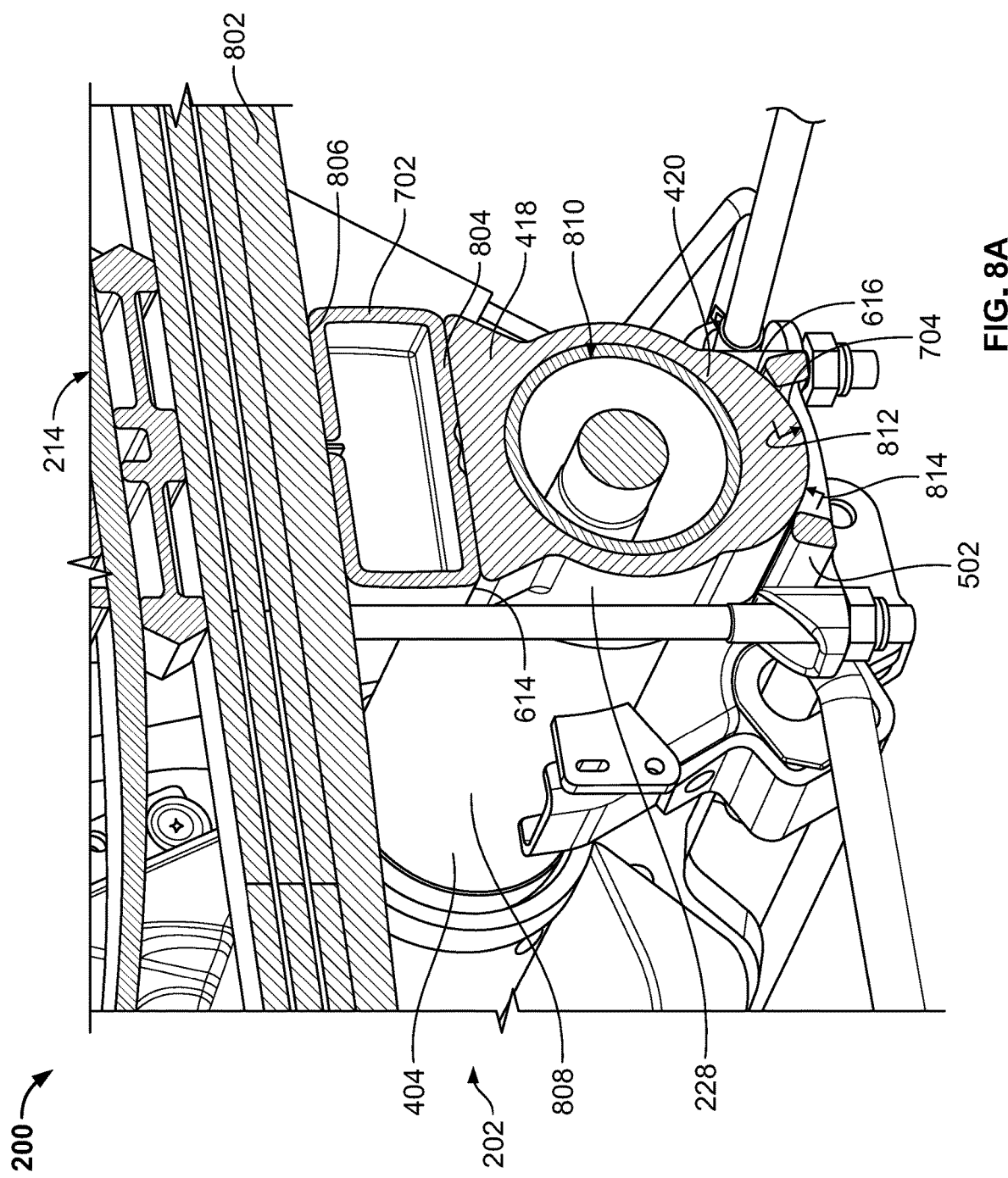
FIG. 8A is a perspective, cross-sectional view of the example vehicle suspension of FIGS. 2-4, 5A and 5B taken through a center of a spring seat.
Figure 8C:
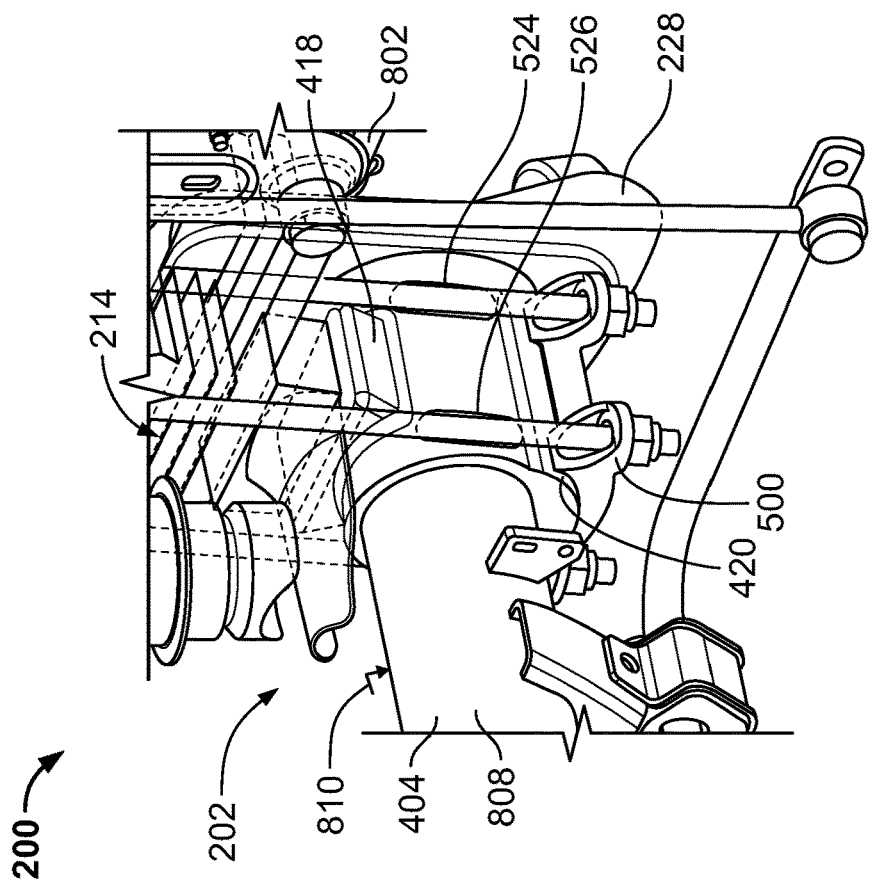
FIG. 8C is a partial, perspective view of the example vehicle suspension of FIGS. 2-4, 5A and 5B.
Figure 8B:
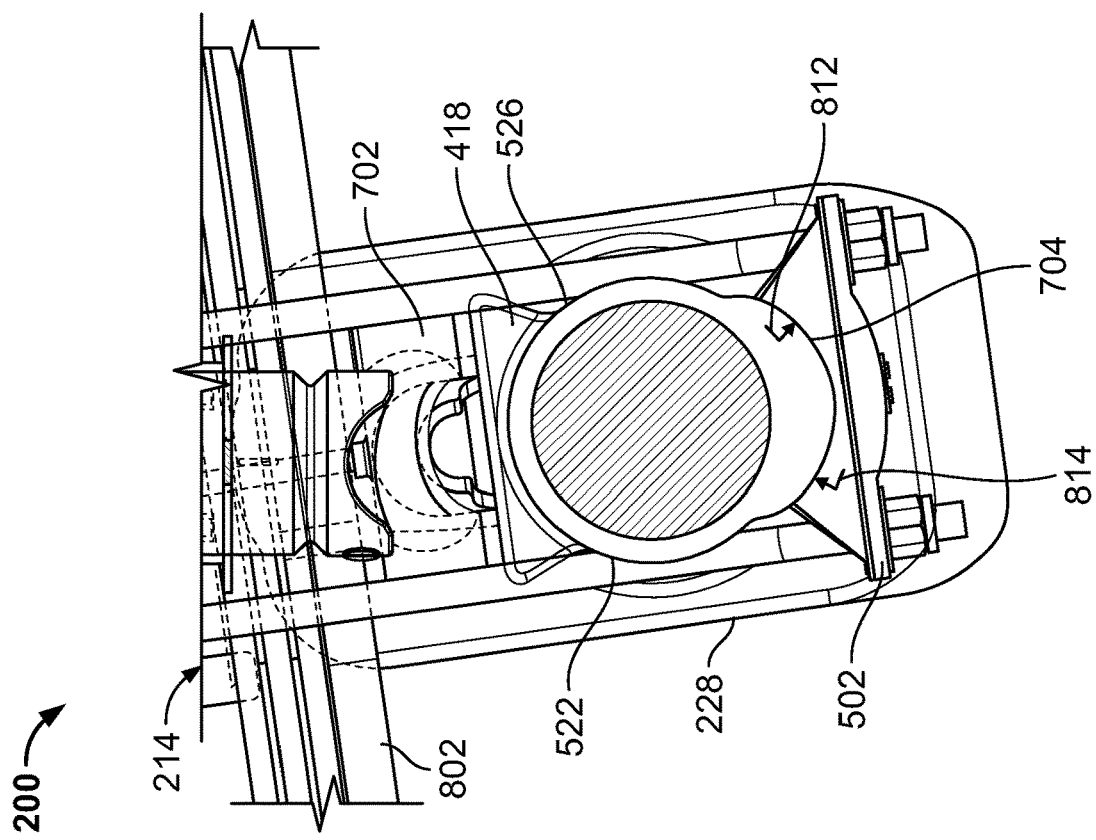
FIG. 8B is a side view of the example yoke of the example vehicle suspension of FIGS. 2-4, 5A and 5B.

FIG. 8A is a perspective, cross-sectional view of the vehicle suspension 200 of FIGS. 2-4, 5A, 5B, and 7. FIG. 8B is a side view of the yoke 228 and the clamp 232 of the vehicle suspension 200 of FIGS. 2-4, 5A, 5B, and 7. FIG. 8C is another partial, perspective view of the vehicle suspension 200 of FIGS. 2-4, 5A, 5B, and 7.

Referring to FIGS. 8A-8C, the spacer 702 is positioned between a leaf spring 802 of the leaf spring assembly 214 and the spring seat 418 of the yoke 228. The spacer 702 has a profile to affect at least one of the pinion angle 302 (FIG. 3) of the vehicle suspension 200 and/or the caster angle 306 (FIG. 3) of the wheel assembly 204. Specifically, a first surface 804 (e.g., a lower surface) of the spacer 702 engages the seating surface 614 of the spring seat 418 of the yoke 228 and a second surface 806 (e.g., an upper surface) of the spacer 702 engages the leaf spring 802 to provide the pinion angle 302 (FIG. 3) and/or the caster angle 306 (FIG. 3). The first surface 804 and the second surface 806 of the illustrated example are substantially flat (e.g., have a less than one-degree slope relative to horizontal).

To accommodate the pinion angle 302 and/or the caster angle 306, the lobe-engaging surface 704 of the guide plate 502 of the illustrated example is rotatably positioned relative to the clamp-engaging surface 616 of the lobe 420. The lobe-engaging surface 704 of the guide plate 502, having a complementary profile to the clamp-engaging surface 616 of the lobe 420, matably engages the clamp-engaging surface 616 of the lobe 420 and can rotate to different rotational positions relative to the lobe 420 to accommodate the pinion angle 302 and/or caster angle 306 provided by the spacer 702. Further, the clamp-engaging surface 616 of the lobe 420 of the illustrated example is complementary to an outer surface 808 of the axle tube 404. For example, as noted above, a radius of curvature 810 of the outer surface 808 of the axle tube 404 is substantially similar (e.g. identical) to a radius of curvature 812 of the clamp-engaging surface 616 of the lobe 420. Therefore, a radius of curvature 814 of the lobe-engaging surface 704 of the guide plate 502 is substantially similar (e.g., identical) to the radius of curvature 810 of the outer surface 808 of the axle tube 404.

In some examples, a wedge or shim may be positioned between the spacer 702 and the spring seat 418 and/or between the spacer 702 and the leaf spring 802 to adjust or alter the pinion angle 302 and/or the caster angle 306. The wedge and/or shim may include an angled or tapered surface or profile. In some examples, to adjust or accommodate different pinion angles and/or the caster angle, a second spacer (e.g., a spacer 906 of FIGS. 9A and 9B) may be employed (e.g., the spacer 702 may be substituted or replaced with the second spacer 906). For example, a first surface and/or a second surface of the second spacer 906 may be tapered, angled and/or canted relative to the first surface 804 and/or the second surface 806 of the spacer 702. Thus, an angled surface of the second spacer in contact with the leaf spring assembly 214 and/or the spring seat 418 provides a desired caster and/or pinion angle when the axle 202 is mounted to the vehicle 100. The lobe 420 and/or the notches 520-526 permits rotational position of the guide plate 502 relative to the lobe 420 when the spacer 702, a wedge, a shim, and/or the second spacer 906 is provided. The lobe 420 and/or the notches 520-526 of the illustrated example allows the fasteners 504, 508 to remain aligned with the guide plate 502.

Figure 9A:
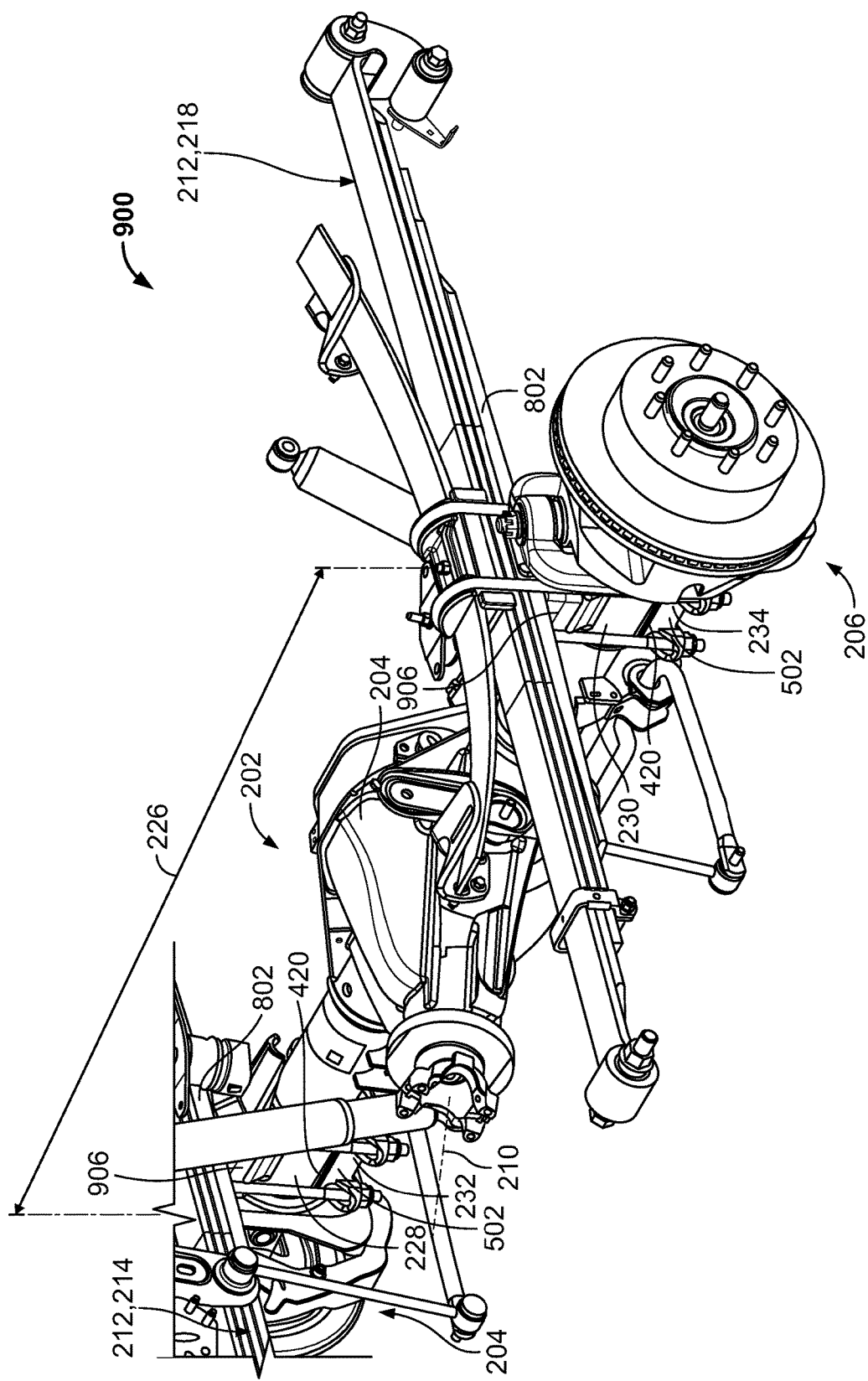
FIG. 9A is a perspective view of another example vehicle suspension disclosed herein.
Figure 9B:
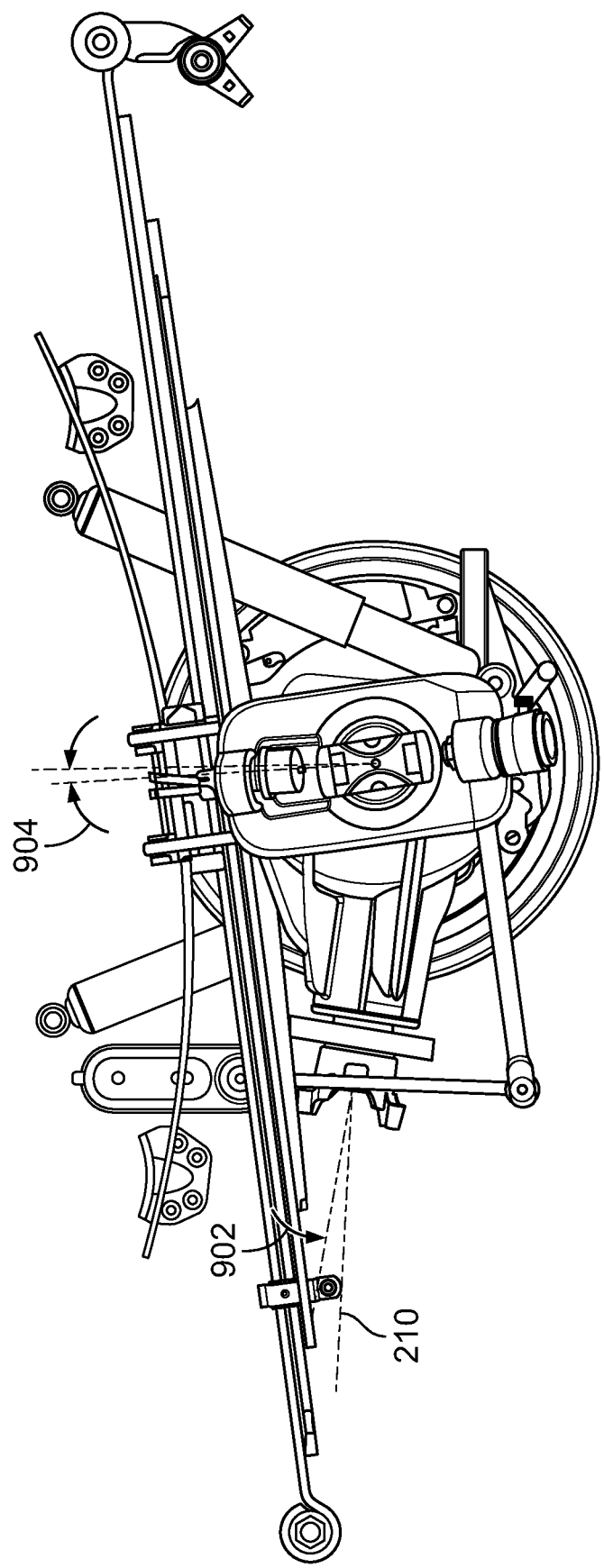
FIG. 9B is a side view of the example vehicle suspension of FIG. 9B.

FIG. 9A illustrates another example vehicle suspension 900 disclosed herein. FIG. 9B is a side view of the vehicle suspension 900 of FIG. 9A. Those components of the vehicle suspension 900 of FIG. 9 that are substantially similar or identical to the components of the vehicle suspension 200 of the illustrated example described above and that have functions substantially similar or identical to the functions of those components will not be described in detail again below. Instead, the interested reader is referred to the above corresponding descriptions. To facilitate this process, similar reference numbers will be used for like structures. For example, the vehicle suspension 900 of the illustrated example includes the axle 202, the wheel assemblies 204, 206, the leaf spring system 212 (e.g., the first and second leaf spring assemblies, 214, 216), the differential 208, the powertrain 210 (e.g., a driveshaft), the lateral distance 226, the yokes 228, 230, and the clamps 232, 234.

The vehicle suspension 900 of FIGS. 9A and 9B is substantially similar to the vehicle suspension 200 of FIGS. 2, 3, 4A, 4B, 5A-5C, 6, 7, and 8A-8C, except a pinion angle 902 of the vehicle suspension 900 and a caster angle 904 of the wheel assembly 204 are different than the pinion angle 302 and the caster angle 306 of the vehicle suspension 200 disclosed above. To provide the pinion angle 902 and the caster angle 904, the vehicle suspension 900 of the illustrated includes a spacer 906 positioned between a leaf spring assembly 214 and a spring seat 418 of the yoke 228, and between a leaf spring assembly 218 and a spring seat 418 of the yoke 230. The spacer 906 has a tapered surface or profile at the interface between the spring seat 418 and the spacer 906 of the leaf spring 802 and the spacer 906. Thus, the spacer 906 provides the pinion angle 902 and the caster angle 904 that are different than the pinion angle 302 and the caster angle 306 of the vehicle suspension 200. The guide plate 502 of the clamp 232 rotates relative to the lobe 420 of the yoke 228 and the guide plate 502 of the clamp 234 rotates relative to the lobe 420 of the yoke 230 to accommodate the pinion angle 902 and the caster angle 904 of the vehicle suspension 900 of FIGS. 9A and 9B. For example, the pinion angle 902 of the illustrated example relative to a driveshaft of a powertrain 210 is approximate 3 degrees. The pinion angle 902 of the illustrated example is greater than the pinion angle 302 of the vehicle suspension 200 disclosed above. The caster angle 904 of the illustrated example is smaller compared to the caster angle 306 of the vehicle suspension 200 disclosed above. Thus, in some examples, the spacers 702 of the vehicle suspension 200 may be replaced with the spacers 906 of FIGS. 9A and 9B to provide the pinion angle 902 and the caster angle 904 to the vehicle suspension 200 of FIGS. 2-4, 5A, 5B, 6, 7 and 8A-8C.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A vehicle suspension comprising:
a yoke to couple a knuckle to an axle of the vehicle suspension, the yoke including:
a spring seat to support a biasing element of the vehicle suspension;
a post to receive the axle;
a lobe projecting from the post,
the lobe defining a clamp-engaging surface; and a guide plate to couple to the clamp-engaging surface of the lobe, the guide plate to couple the biasing element to the yoke via the spring seat; and
a fastener that removably coupes to the guide plate to couple the biasing element to the yoke, the yoke including of a first notch to receive a first portion of the fastener and a second notch to receive a second portion of the fastener, the first notch being adjacent the second notch.

2. The suspension of claim 1, wherein the clamp-engaging surface has a profile that is complementary to a lobe-engaging surface of the guide plate.

3. The suspension of claim 1, wherein the guide plate is rotatable along at least a portion of the lobe.

4. The suspension of claim 3, wherein the guide plate is rotatable relative to the lobe to provide a first pinion angle or a second pinion angle associated with the vehicle suspension.

5. The suspension of claim 3, wherein the guide plate is rotatable relative to the lobe to provide a first caster angle or a second caster angle associated with a wheel assembly of the vehicle suspension.

6. The suspension of claim 1, wherein the guide plate includes a fastener receiving portion to receive the fastener that couples the biasing element to the axle.

7. The suspension of claim 1, wherein the spring seat is positioned opposite the lobe.

8. The suspension of claim 1, wherein the post, the lobe and the spring seat are integrally formed as a unitary structure.

9. The suspension of claim 1, wherein the lobe includes a radius of curvature that is substantially similar to a radius of curvature of an outer surface of the axle.

10. A vehicle suspension apparatus comprising:
a yoke to couple a steerable wheel assembly to a solid axle, the yoke having a post to receive the solid axle and a clamp-engaging surface positioned adjacent the post, the yoke including a first notch and a second notch adjacent the first notch; and
a clamp including a fastener to removably couple to a plate to couple a leaf spring assembly of the vehicle suspension to the yoke, the first notch to receive a first portion of the fastener and the second notch to receive a second portion of the fastener, the clamp having a lobe-engaging surface to ratably engage the clamp-engaging surface of the yoke when the clamp is coupled to the yoke, the clamp being rotatable relative to the clamp-engaging surface of the yoke to adjust at least one of a first pinion angle of the vehicle suspension or a first caster angle of the wheel assembly.

11. The suspension of claim 10, wherein the first notch and the second notch are positioned above the clamp-engaging surface of the yoke.

12. The suspension of claim 10, wherein the yoke includes a spring seat integrally formed with the yoke, the spring seat to receive the leaf spring assembly.

13. The suspension of claim 12, further including a first spacer to be positioned between the leaf spring assembly and the spring seat, the first spacer to provide the at least one of the first pinion angle of the vehicle suspension or the first caster angle to the wheel assembly.

14. The suspension of claim 13, further including a second spacer to be positioned between the leaf spring assembly and the spring seat, the second spacer to provide at least one of a second pinion angle of the vehicle suspension or a second caster angle to the wheel assembly, the first pinion angle being different than the second pinion angle, and the first caster angle being different than the second caster angle.

\* \* \* \* \*